April 26, 1966  F. E. MINDT ETAL  3,248,651
INDUCTION METER HAVING PLURAL ANTI-CREEP HOLES
IN ITS ARMATURE DISC
Filed May 7, 1962

WITNESSES
John E. Healy Jr.
James F. Young

INVENTORS
Frederick E. Mindt &
William J. Zisa
BY C. L. Freedman
ATTORNEY

United States Patent Office  3,248,651
Patented Apr. 26, 1966

3,248,651
INDUCTION METER HAVING PLURAL ANTI-CREEP HOLES IN ITS ARMATURE DISC
Frederick E. Mindt, Raleigh, and William J. Zisa, Cary, N.C., assignors to Westinghouse Electric Corporation, East Pittsburgh, Pa., a corporation of Pennsylvania
Filed May 7, 1962, Ser. No. 192,900
10 Claims. (Cl. 324—137)

This invention relates to induction meters and it has particular relation to induction meters designed to facilitate operation of devices dependent on rotation of meter armatures.

Although aspects of the invention are applicable to various types of induction devices the invention is particularly suitable for integrating product-type meters and will be described as applied to an induction watthour meter.

In a conventional induction watthour meter an armature usually in the form of an electroconductive disc is mounted for rotation with respect to an electromagnet having voltage and current windings. Energization of the voltage and current windings applies a shifting magnetic field to the disc for the purpose of producing rotation of the disc about its axis.

In order to compensate for the effects of friction on the armature disc, it is the practice to apply a small compensating torque to the disc which is employed to compensate for friction and/or non-linear response. Continuous rotation of the armature disc by the compensating torque alone is prevented by associating with the disc some discontinuity which prevents such undesired rotation. Such a discontinuity may take the form of a small magnetic element secured to the disc which is magnetically attracted when it is adjacent the damping magnet of the meter or the electromagnet. In this country it is more common to provide the armature disc with one or more anti-creep holes for the purpose of preventing continuous rotation of the armature disc by the compensating torque alone.

The discontinuity in the armature disc also may be employed for providing outputs dependent on disc rotation. Thus, when one of the anti-creep holes occupies a predetermined position a light beam may be directed through the anti-creep hole to a photocell. An electrical pulse is derived from the photocell for each movement of an anti-creep hole across the path of the light beam. The electrical pulses produced in this manner may be employed for totalizing or remote metering purposes or they may be employed in controlling test devices for testing the performance of the meter.

Some difficulties have been encountered in obtaining adequate electric pulses from the discontinuity normally provided for armature discs. Thus, the anti-creep hole may be so small that it is difficult to transmit sufficient light therethrough. If the anti-creep hole is enlarged to provide greater light transmission, the resultant increase in anti-creep torque may be objectionable.

Another difficulty in the production of adequate electric pulses arises from the location adjacent the armature disc of apparatus such as damping magnets and meter registers. Such apparatus may interfere physically with the provision of the desired light beam in a position suitable for transmission through the anti-creep holes.

In accordance with the invention the discontinuities are made sufficiently large to provide adequate electric pulses without objectionably affecting the anti-creep torque. This is accomplished by providing the discontinuities in pairs. The two discontinuities in a pair produce oppositely directed torques. The sizes of the two discontinuities in a pair may be increased appreciably without adversely affecting the resultant or the difference torque applied thereby to the armature disc. Furthermore, the two discontinuities in a pair may be placed at different distances from the disc axis. This increases the likelihood of associating a pickup device with one of the discontinuities without interference from auxiliary apparatus.

It is therefore an object of the invention to provide an improved construction for an induction meter.

It is also an object of the invention to provide the armature of an induction meter with plural discontinuities having opposite effects on rotation of the armature.

It is a further object of the invention to provide an induction meter with anti-creep holes of increased size without substantial effect on the control of armature movement exercised by the anti-creep holes.

It is an additional object of the invention to provide an improved measuring device for producing electric impulses wherein a light beam is directed through anti-creep holes in the armature of an induction watthour meter.

Other objects of the invention will be apparent from the following description taken in conjunction with the accompanying drawing in which.

Figure 1:
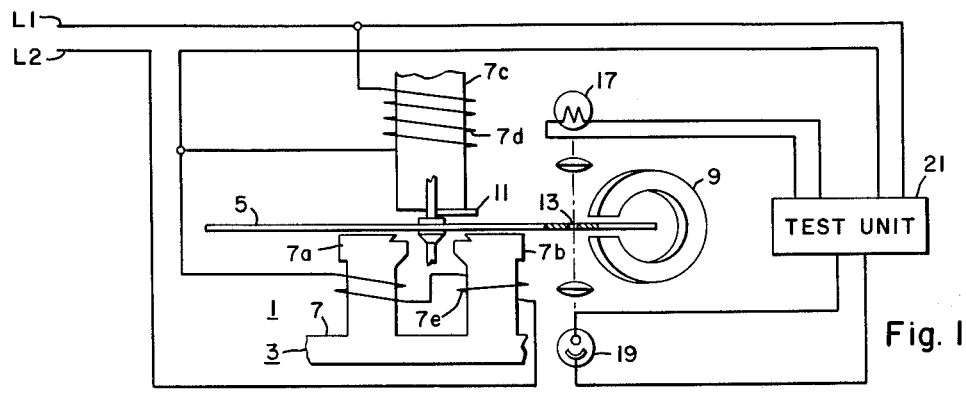
FIG. 1 is a schematic view with parts shown in elevation and parts broken away of a measuring device embodying the invention.

Referring to the drawing, FIG. 1 shows a measuring device 1 for measuring an electrical quantity supplied by an alternating current circuit represented by conductors L1 and L2. For illustrative purposes it will be assumed that the measuring device is a watthour meter designed to measure electric energy and that the alternating current circuit is a single-phase circuit designed to supply electric power at a power frequency such as 60 cycles per second.

The measuring device 1 includes an electromagnet 3 having an air gap for receiving a portion of an electroconductive armature in the form of a disc 5 which is suitably mounted for rotation about the disc axis relative to the electromagnet. In the specific embodiment illustrated the electromagnet includes a magnetic structure 7 having current poles 7a and 7b spaced from a voltage pole 7c to provide the air gap for the armature disc 5. A voltage winding 7d surrounds the voltage pole 7c and contains many turns of small diameter conductors connected for energization in accordance with the voltage across the conductors L1 and L2. The current poles have current winding 7e associated therewith and these windings are connected for energization in accordance with current flowing through the conductor L2. The current windings are so disposed that when the winding on the pole 7a directs magnetic flux upwardly in the pole, the winding associated with the pole 7b directs magnetic flux downwardly through the latter pole. A permanent magnet 9 has an air gap for receiving a portion of the armature disc 5. The permanent magnet damps rotation of the armature disc in a manner well understood in the art.

When the windings of the electromagnet are energized, a shifting magnetic field is produced in the air gap which results in rotation of the armature disc at a rate dependent on energy supplied by the alternating current circuit. The amount of, energy supplied may be determined by counting the rotation of the armature disc through a conventional register (not shown).

In order to compensate for friction and/or non-linear response, a small torque conventionally is applied to the armature disc acting in the same direction as the torque supplied by the windings of the electromagnet. Such a compensating torque is supplied by an electroconductive light-load adjusting plate 11 located adjacent the pole face of the voltage pole 7c.

Figure 2:
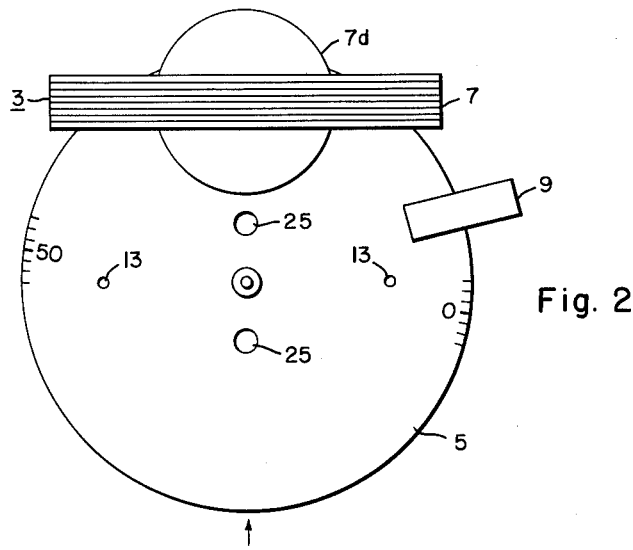
FIG. 2 is a view in top plan of an induction meter employed in the measuring device of FIG. 1.

Because of the compensating torque applied to the armature disc 5, the disc tends to rotate even though no current is supplied to the current windings 7e. To prevent such rotation, one or more discontinuities may be associated with the armature disc to provide a torque acting in opposition to the compensating torque at certain locations of the armature disc. To this end, one or more anti-creep holes 13 may be provided in the armature disc. Two anti-creep holes located on opposite sides of the disc axis are illustrated in FIGS. 1 and 2. The components of the watthour meter thus far specifically recited for FIG. 1 and the operation of such a watthour meter are well understood in the art.

It has been found desirable to produce electric pulses dependent on rotation of the armature disc 5. Such electric pulses may be produced by providing pickups responsive to movement of the discontinuities employed for preventing creeps of the armature disc. In the embodiment of FIG. 1, a pickup is provided which includes a lamp 17 for directing a beam of light through one of the anti-creep holes 13 to the photocell 19. The photocell may be associated with an electric circuit for producing an electric pulse for each movement of an anti-creep hole 13 across the path of the beam of light.

Figure 3:
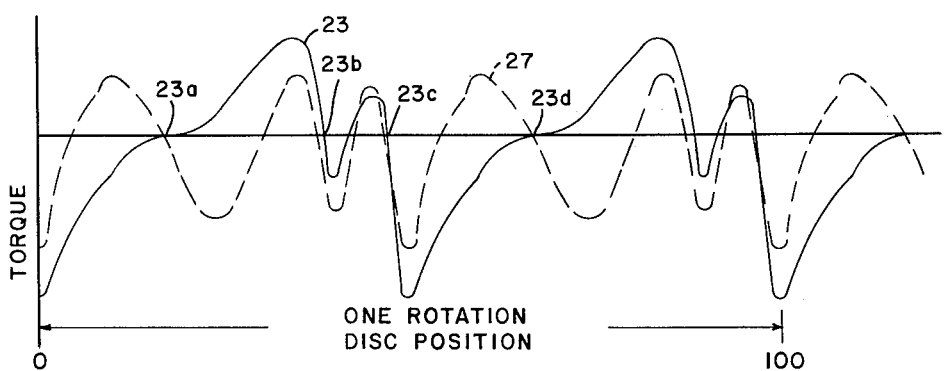
FIG. 3 is a graphical representation of curves useful in describing the invention.

The resulting electric pulses may be employed for various purposes. For example, these electric pulses may be employed for impulse totalization in the manner discussed on page 156 of the Electrical Meterman's Handbook, sixth edition, published in 1950 by the Edison Electric Institute of New York City. As a further example, the electric pulses may be employed for testing the watthour meter in the manner illustrated in FIG. 9–3 shown on page 220 of the aforesaid Electrical Metermen's Handbook. For present purposes it will be assumed that the electric pulses are employed for controlling a test unit 21 which is similar to that shown in FIG. 9–3 of the aforesaid Electrical Metermen's Handbook.

Difficulties have been encountered in the prior art in applying light beam pickups to watthour meters. The electromagnet, damping magnet and auxiliary apparatus such as the meter register seriously limit the space available for directing light beams across the armature disc. Furthermore, the small size of prior art anti-creep holes makes it difficult to assure adequate light for operation of the photocell 19. Enlargement of the anti-creep hole may result in an undesirable increase in the anti-creep torque produced thereby. Such an increase is undesirable for the reason that it can require an excessive starting torque for starting the watthour meter in operation. As a typical example, an anti-creep hole having a diameter of .060 inch has been employed in a watthour meter having reasonable starting watts and safety requirements.

The performance of the anti-creep hole may be understood by reference to the full-line curve 23 in FIG. 3 of the drawing. This curve shows the variation in torque produced by the anti-creep hole over one rotation of the armature disc of the watthour meter. For this curve abscissas represent positions of the armature disc and ordinates represent torques applied to the armature disc by the electromagnet. It will be noted that for certain positions of the disc the effect of the anti-creep hole is to provide an aiding torque which increases the rate of rotation of the disc. For example, between the positions 23a and 23b the effect of the anti-creep holes is to increase the torque acting on the armature disc. For other positions of the armature disc, the effect of the anti-creep holes is to provide an opposing torque acting on the armature disc. For example, between the positions 23c and 23d of the armature disc the effect of the anti-creep holes is to produce a torque acting in opposition to the main driving torque of the electromagnet. By proper proportioning of the anti-creep holes the maximum value of this opposing torque may be made larger than the compensating torque produced by the plate 11. In this manner the anti-creep holes act to prevent rotation of the armature disc when no current flows through the current windings of the watthour meter.

In accordance with the invention the discontinuities such as the creep control holes are arranged in pairs. For a given position of the armature disc the holes of a pair have opposing effects on the torque applied to the armature disc. Thus, in FIG. 2 the two anti-creep holes 13 are associated with two auxiliary creep control holes 25.

Referring again to FIG. 3, it will be recalled that between the positions 23c and 23d of the armature disc one of the anti-creep holes 13 in effect provides an anti-creep torque which prevents continuous rotation of the armature disc by the compensating torque. One of auxiliary holes 25 is so positioned and dimensioned that for the same position of the armature disc it produces an aiding torque which is in the same direction as the compensating torque produced by the plate 11. The resultant or difference torque produced by the anti-creep holes 13 and the auxiliary holes 25 is represented in FIG. 3 by the dotted line 27.

By reference to FIG. 3 it will be noted that the anti-creep torque produced by the joint action of the holes 13 and 25 is materially smaller than that produced by the anti-creep holes 13 acting alone. Thus, the diameter of the holes 13 and 25 may be increased appreciably without increasing the anti-creep torque above objectionable limits.

In a conventional watthour meter disc it has been found satisfactory to locate the holes 25 along a line transverse to the line intersecting the axes of the holes 13. In this example the holes 25 had diameters of 0.128 inch and were located on opposite sides of the disc axis each being one-half inch from such axis. Each of the anti-creep holes 13 was increased in diameter from the previously employed 0.060 inch to 0.070 inch, and each was located approximately 0.906 inch from the axis of the disc which had a diameter of 3.56 inches.

Because of the larger diameters of the holes 25, sufficient light readily may be passed therethrough to assure positive operation of the photocell 19. Furthermore, it will be noted that the holes 25 and 13 are at different distances from the axis of the disc. Thus, if apparatus associated with the disc interferes with the utilization of the holes 25 for the light beam, the light beam may be associated with the anti-creep holes 13 which have diameters larger than those previously employed. This permits greater flexibility in the design and selection of the apparatus.

Although the invention has been described with reference to certain specific embodiments thereof, numerous modifications falling within the spirit and scope of the invention are possible.

We claim as our invention:

1. In an induction meter assembly, an electroconductive armature unit, a stator unit mounting the armature unit for rotation about an axis relative to the stator unit, said stator unit including means effective when energized for establishing a shifting magnetic field urging the armature in a first direction of rotation relative to the stator unit, said armature unit including a first discontinuity acting to establish a discontinuity-derived torque about said axis opposing rotation of the armature unit in said first direction when the armature unit occupies a first angular position, and a second discontinuity acting to establish a discontinuity-derived torque about said axis aiding rotation of the armature unit in said first direction when the armature unit occupies said first angular position, said discontinuities being proportioned to produce a resultant discontinuity-derived torque for said first angular position opposing rotation of the armature unit in said first direction.

2. In an induction meter assembly, an electroconductive armature unit, a stator unit mounting the armature unit for rotation about an axis relative to the stator unit, said stator unit including means effective when energized for establishing a shifting magnetic field urging the armature in a first direction of rotation relative to the stator unit, said armature unit including a first hole acting to establish a hole-derived torque about said axis acting to oppose rotation of the armature unit in said first direction when the armature unit occupies a first angular position, and a second hole acting to establish a hole-derived torque about said axis acting to aid rotation of the armature unit in said first direction when the armature unit occupies said first angular position.

3. In an induction meter assembly, an electroconductive armature disc, a stator unit mounting the armature disc for rotation about the disc axis relative to the stator unit, said stator unit comprising voltage winding means effective when energized by alternating voltage for directing alternating voltage magnetic flux through the disc, and current winding means effective when energized by alternating current for directing alternating current magnetic flux through the disc, said fluxes coacting to provide a shifting magnetic field urging the disc in a first direction about the disc axis relative to the stator unit, said disc having an anti-creep hole positioned to produce in cooperation with the voltage magnetic field a hole-derived torque opposing movement of the disc in said first direction when the disc occupies a predetermined angular position relative to the stator unit, said disc having a second hole positioned to produce in cooperation with the voltage magnetic flux a hole-derived torque aiding movement of the disc in said first direction when the disc occupies said predetermined angular position.

4. In an induction meter assembly, an electroconductive armature disc, a stator unit mounting the armature disc for rotation about the disc axis relative to the stator unit, said stator unit comprising voltage winding means effective when energized by alternating voltage for directing alternating voltage magnetic flux through the disc, and current winding means effective when energized by alternating current for directing alternating current magnetic flux through the disc, said fluxes coacting to provide a shifting magnetic field urging the disc in a first direction about the disc axis relative to the stator unit, said disc having an anti-creep hole positioned to produce in cooperation with the voltage magnetic flux a hole-derived torque opposing movement of the disc in said first direction when the disc occupies a predetermined angular position relative to the stator unit, said disc having a second hole positioned to produce in cooperation with the voltage magnetic flux a hole-derived torque aiding movement of the disc in said first direction when the disc occupies said predetermined angular position, said holes being spaced angularly from each other about said axis and being at different radial distances from said axis.

5. In an induction meter assembly, an electroconductive light-impermeable armature disc, a stator unit mounting the armature disc for rotation about the disc axis relative to the stator unit, said stator unit comprising voltage winding means effective when energized by alternating voltage for directing alternating voltage magnetic flux through the disc, and current winding means effective when energized by alternating current for directing alternating current magnetic flux through the disc, said fluxes coacting to provide a shifting magnetic field urging the disc in a first direction about the disc axis relative to the stator unit, said disc having an anti-creep hole positioned to produce in cooperation with the voltage magnetic flux a hole-derived torque opposing movement of the disc in said first direction when the disc occupies a predetermined angular position relative to the stator unit, said disc having a second hole positioned to produce in cooperation with the voltage magnetic flux a hole-derived torque aiding movement of the disc in said first direction when the disc occupies said predetermined angular position, and means for producing a light beam in a direction parallel to said axis and spaced from the axis by the same radial distance as one of said holes, whereby said hole intermittently transmits said light beam through said disc during each rotation of the disc, and translating means responsive to the presence of said light beam when the light beam has passed through said disc.

6. In an induction meter assembly, an electroconductive armature disc, a stator unit mounting the armature disc for rotation about the disc axis relative to the stator unit, said stator unit comprising voltage winding means effective when energized by alternating voltage for directing alternating voltage magnetic flux through the disc, and current winding means effective when energized by alternating current for directing alternating current magnetic flux through the disc, said fluxes coacting to provide a shifting magnetic field urging the disc in a first direction about the disc axis relative to the stator unit, said disc having an anti-creep hole positioned to produce in cooperation with the voltage magnetic flux a hole-derived torque opposing movement of the disc in said first direction when the disc occupies a predetermined angular position relative to the stator unit, said disc having a second hole positioned to produce in cooperation with the voltage magnetic flux a hole-derived torque aiding movement of the disc in said first direction when the disc occupies said predetermined angular position, said holes being spaced angularly from each other about said axis and being at different radial distances from said axis, said hole-derived torques providing a resultant torque which opposes movement of the disc in said first direction.

7. In an induction meter assembly, an electroconductive armature disc, a stator unit mounting the disc for rotation about the disc axis relative to the stator unit, said stator unit comprising an electromagnet having voltage and current windings effective when energized for producing a shifting magnetic field for said disc at a position on one side of the disc axis, said electromagnet including means effective when the voltage winding alone is energized for establishing a shifting magnetic field acting to apply a compensating torque urging the disc in a first direction about the disc axis, said disc having at least one anti-creep hole positioned to develop a first hole-derived torque opposing movement of the disc in said first direction when the disc is in a predetermined position, said disc having a second hole positioned to develop a second hole-derived torque aiding movement of the disc in said first direction when the disc occupies said predetermined position, said second hole-derived torque being smaller than said first hole-derived torque to produce a resultant torque which is larger than said compensating torque.

8. In an induction meter assembly, an electroconductive armature disc, a stator unit mounting the disc for rotation about the disc axis relative to the stator unit, said stator unit comprising an electromagnet having voltage and current windings effective when energized for producing a shifting magnetic field for said disc at a position on one side of the disc axis, said electromagnet including means effective when the voltage winding alone is energized for establishing a shifting magnetic field acting to apply a compensating torque urging the disc in a first direction about the disc axis, said disc having at least one anti-creep hole positioned to develop a first hole-derived torque opposing movement of the disc in said first direction when the disc is in a predetermined position, said disc having a second hole positioned to develop a second hole-derived torque aiding movement of the disc in said first direction when the disc occupies said predetermined position, said second hole-derived torque being smaller than said first hole-derived torque to produce a resultant torque which is larger than said compensating torque, said holes being spaced from the disc axis by different distances.

9. In an induction meter assembly, an electroconductive armature disc, a stator unit mounting the armature disc for rotation about the disc axis relative to the stator unit, said stator unit comprising voltage winding means effective when energized by alternating voltage for directing alternating voltage magnetic flux through the disc, and current winding means effective when energized by alternating current for directing alternating current magnetic flux through the disc, said fluxes coacting to provide a shifting magnetic field urging the disc in a first direction about the disc axis relative to the stator unit, said disc having a pair of first holes symmetrically disposed on opposite sides of said axis to produce in cooperation with the voltage magnetic flux a hole-derived torque acting about the axis between the armature disc and the stator unit, said disc having a pair of second holes symmetrically disposed on opposite sides of said axis to produce in cooperation with the voltage magnetic flux a hole-derived torque acting about the axis between the armature disc and the stator unit, said hole-derived torques acting in opposing directions as the armature disc passes through a predetermined angular position.

10. In an induction meter assembly, an electroconductive armature disc, a stator unit mounting the armature disc for rotation about the disc axis relative to the stator unit, said stator unit comprising voltage winding means effective when energized by alternating voltage for directing alternating voltage magnetic flux through the disc, and current winding means effective when energized by alternating current for directing alternating current magnetic flux through the disc, said fluxes coacting to provide a shifting magnetic field urging the disc in a first direction about the disc axis relative to the stator unit, said disc having a pair of first holes symmetrically disposed on opposite sides of said axis to produce in cooperation with the voltage magnetic flux a hole-derived torque acting about the axis between the armature disc and the stator unit, said disc having a pair of second holes symmetrically disposed on opposite sides of said axis to produce in cooperation with the voltage magnetic flux a hole-derived torque acting about the axis between the armature disc and the stator unit, a line connecting the first holes being spaced about the axis for a substantial angular distance from a line connecting the second holes, said first holes being nearer than said second holes to said axis, said hole-derived torques acting in opposing directions as the armature disc passes through a predetermined angular position.

References Cited by the Examiner

UNITED STATES PATENTS

| | | | |
|---|---|---|---|
| 696,459 | 4/1902 | Lunt | 324—137 |
| 2,788,488 | 4/1957 | Graefnitz | 324—138 |

FOREIGN PATENTS

| | | |
|---|---|---|
| 467,289 | 10/1928 | Germany. |

WALTER L. CARLSON, *Primary Examiner.*

RUDOLPH V. ROLINEC, *Assistant Examiner.*